Patented May 19, 1931

1,806,547

UNITED STATES PATENT OFFICE

THOMAS MIDGLEY, JR., CHARLES ALLEN THOMAS, AND CARROLL A. HOCHWALT, OF DAYTON, OHIO, ASSIGNORS TO GENERAL MOTORS CORPORATION, OF DETROIT, MICHIGAN, A CORPORATION OF DELAWARE

MANUFACTURE OF RUBBER

No Drawing. Application filed December 22, 1927. Serial No. 242,009.

The invention relates to means for improving the properties of rubber and is particularly concerned with the control of the tensile strength of the rubber and with means for imparting to rubbers, whether synthetic or natural, which are deficient in the quality of toughness or the properties which impart tensile strength to the manufactured product, of a sufficient degree of such quality to meet the demands for a satisfactory commercial product.

It is well known that the principal constituent, as a definite chemical body, of a natural rubber of relatively high grade, such as that obtained from the *Hevea brasiliensis*, is a hydrocarbon having the formula $(C_{10}H_{16})_n$. We have found that this body is the constituent which determines the elasticity or resilience of the rubber. While the structural formula of this body has not been definitely fixed it is clear that the form or forms present in natural rubbers involve a relatively high degree of polymerization.

Other bodies present in natural rubbers and having an important effect upon the utility of the product are those having antioxidant and those having vulcanization accelerating properties. The presence or absence of these bodies, however, is not material in the processes of manufacturing rubber since other bodies are well known and generally employed which, when added to rubber, have an equal or even greater effectiveness.

We have also been able to separate from natural rubber, by the process described in the copending application, Ser. No. 238,458, filed Dec. 7, 1927, a nitrogenous constituent which analysis has indicated to have the formula $(C_{10}H_{17}O_2N)_n$. Tests applied to specimens of this substance tend to show that it is an organic acid whose molecule has a chain structure and contains one amino or $NH_2$ group for each ten carbon atoms. This material we have found to be the constituent whose presence determines the tensile strength of the vulcanized product. In a high grade of natural rubber it occurs to the amount of about five per cent of the total weight.

We have found that the properties of rubber which are dependent upon the presence of the nitrogenous body above referred to may be imparted or restored by adding to the rubber deficient in such properties any one of numerous amino acids. Our invention, therefore, contemplates the compounding of an amino acid with a rubber hydrocarbon and suitable vulcanizing agents and then vulcanizing the mixture to obtain a product having a high degree of tensile strength and elasticity.

Our investigations have shown that the tensile strength of vulcanized rubber bears a definite relation to the proportion of the natural nitrogenous body, which we may term B rubber, relative to the rubber hydrocarbon, which we may term A rubber. If there is either an excess or a deficiency of the B rubber the quality of the vulcanized product suffers. Our invention therefore also contemplates the control of the B constituent, whether of the natural rubber or of the added or substituted amino acid. If, for example, the natural rubber, which may be of an inferior grade, contains an excess of the B constituent, we can either reduce this constituent by suitable extraction of a portion thereof or by removal of the whole content and replacement of a definite quantity thereof or substitution of one or more amino acids of suitable characteristics and in sufficient quantity to yield the maximum tensile strength. Similarly, if the B constituent is present in too small a quantity for best results, we may add amino acid or replace that already present by suitable acid or acids. We may also, by addition of the A constituent, either of natural or synthetic origin, or by extraction of a portion of the A constituent, adjust the proportions of the two constituents in such manner as to produce or reproduce the optimum conditions for development of the desired properties.

Our invention further contemplates the revitalizing of rubber or mixtures thereof which have deteriorated by reason of aging or improper preservation. We have found, for example, that rubber which has deteriorated by reason of exposure to the light in a benzol solution may be restored to substantially its original strength, provided the deterioration has not proceeded too far, by incorporation therewith of a suitable amino acid. The invention is also applicable to the compounding of rubber in which the A constituent is produced wholly by synthetic methods, for example, by polymerization of isoprene.

An important phase of the invention resides in its applicability in the production, by partially synthetic methods, of a high grade of rubber by extraction of the A constituent from any natural product in which a rubber hydrocarbon of suitable properties is present and compounding this constituent with one or more amino acids together with the necessary vulcanization accelerators, antioxidants, and any other desired or usual ingredients.

The amino acids most suitable for replacing or reinforcing the B constituent to improve the strength of the resultant product are in general those of the aliphatic series, at least these are generally more effective than those of the aromatic series. It also appears that the straight chain or normal acids are preferable to the branched type isomers. The substitution in the hydrocarbon molecule of other groups than the acid group and the amino group is not desirable and the more neutral compounds appear to yield better results than those which are strongly acid. Our investigations indicate also that ability to impart tensile strength is to some extent a function of molecular weight, the compounds with a large number of carbon atoms being more powerful. In practical use, for example, we have found that the amino acids of low molecular weight, such as glycine (amino acetic acid) and sarcosine, are of relatively low efficiency although we have been able by their use to revitalize to a marked degree rubber that had deteriorated by aging or exposure to light in a benzol solution. A higher member of the series, such as alpha amino caprylic acid, acts much more powerfully and the effect of still higher members, for example, alpha amino stearic acids, is even more remarkable. It will be noted that all of these acids are of the carboxylic type.

As a specific illustration, by extracting from ordinary pale crepe rubber the rubber hydrocarbon, adding thereto about 6% of alpha amino caprylic acid, compounding with the ingredients and vulcanizing under the conditions usually regarded as yielding a product of maximum tensile strength, we obtained a product having even higher tensile strength than that obtainable from the ordinary natural rubber treated under similar conditions of compounding and vulcanization.

Although, in general, the aliphatic, carboxylic acids are more effective than those of the aromatic series, some of the latter give results comparable to those obtained with the aliphatic acids. The meta and ortho amino benzoic acids, for example, show the strength imparting property to a high degree.

We claim:

1. The process of treating rubber to improve the tensile strength of the vulcanized product comprising compounding with the raw or unvulcanized rubber an amino carboxylic acid capable of increasing the tensile strength of the vulcanized product and vulcanizing agents and then vulcanizing the mixture.

2. The process of producing a rubber product which comprises extracting from a natural rubber the rubber hydrocarbon contained therein, compounding said hydrocarbon with an amino carboxylic acid and vulcanizing agents and vulcanizing the mixture.

3. The process of controlling the properties of vulcanized rubber comprising the determining of the content of aliphatic amino carboxylic acid required to impart to the vulcanized product the optimum properties, and adjusting the content of amino acid by addition or removal to correspond approximately with the content so determined.

4. The process of producing a rubber-like product comprising extracting from natural sources a substance having resilience imparting properties similar to those of the hydrocarbon constituent of natural rubber, adding thereto an aliphatic amino carboxylic acid and vulcanizing agents and vulcanizing the mixture.

5. A product obtained by vulcanization of a mixture of vulcanizing agents, one or more aliphatic amino carboxylic acids, and a body having resilience-imparting properties similar to those of the hydrocarbon constituent of natural rubber.

6. A product obtained by vulcanization of a mixture of a rubber hydrocarbon, an amino carboxylic acid not present in natural rubber and vulcanizing agents.

7. The process of treating rubber to improve the tensile strength of the vulcanized product comprising compounding with the unvulcanized rubber an aliphatic amino carboxylic acid higher in the series than sarcosine and vulcanizing the product.

8. The process of preparing a rubber product having high tensile strength comprising extracting from natural rubber the rubber hydrocarbon, compounding with such hydrocarbon an aliphatic amino carboxylic acid higher in the series than sarcosine and vulcanizing the product.

9. The process as set forth in claim 8, the acid used being alpha amino stearic acid.

In testimony whereof we affix our signatures.

THOMAS MIDGLEY, JR.
CHARLES ALLEN THOMAS.
CARROLL A. HOCHWALT.